United States Patent
Fiekens et al.

(10) Patent No.: US 10,906,809 B2
(45) Date of Patent: *Feb. 2, 2021

(54) OZONE GENERATOR WITH POSITION-DEPENDENT DISCHARGE DISTRIBUTION

(71) Applicant: XYLEM IP MANAGEMENT S.À R.L., Senningerberg (LU)

(72) Inventors: Ralf Fiekens, Schlossholte-Stukenbrock (DE); Reiner Fietzek, Herford (DE); Manfred Salvermoser, Herford (DE); Nicole Brüggemann, Enger (DE)

(73) Assignee: XYLEM IP MANAGEMENT S.à r.l., Senningertrerg (LU)

( * ) Notice: Subject to any disclaimer, the term of this patent is extended or adjusted under 35 U.S.C. 154(b) by 613 days.

This patent is subject to a terminal disclaimer.

(21) Appl. No.: 15/552,674

(22) PCT Filed: Jan. 15, 2016

(86) PCT No.: PCT/EP2016/050761
§ 371 (c)(1),
(2) Date: Jan. 30, 2018

(87) PCT Pub. No.: WO2016/134878
PCT Pub. Date: Sep. 1, 2016

(65) Prior Publication Data
US 2019/0010051 A1    Jan. 10, 2019

(30) Foreign Application Priority Data
Feb. 23, 2015   (DE) .................. 10 2015 002 102

(51) Int. Cl.
*C01B 13/11* (2006.01)
*D21C 9/153* (2006.01)
(Continued)

(52) U.S. Cl.
CPC ............... *C01B 13/11* (2013.01); *C02F 1/78* (2013.01); *D21C 9/153* (2013.01); *H01T 19/00* (2013.01);
(Continued)

(58) Field of Classification Search
None
See application file for complete search history.

(56) References Cited

U.S. PATENT DOCUMENTS 5,956,562 A    9/1999  Lo et al.
6,106,788 A *  8/2000  Rau .................... B01J 19/088
                                                   422/186.07
(Continued)

FOREIGN PATENT DOCUMENTS

DE   102011008947 A1   7/2012
JP      0881205 A       3/1996
(Continued)

OTHER PUBLICATIONS

Non Final Office Action for U.S. Appl. No. 15/552,678, dated Sep. 17, 2019, 9 pages.
(Continued)

*Primary Examiner* — Kishor Mayekar
(74) *Attorney, Agent, or Firm* — RatnerPrestia

(57) ABSTRACT

An ozone generator includes a high-voltage electrode and at least one counter electrode, which define an interstice in which at least one dielectric is arranged and through which a gas flows in the flow direction. The high-voltage electrode and the at least one counter electrode are provided with a connection for an electrical voltage supply to generate silent discharges which are discharged from surface discharge locations. The mean sparking distance and the mean spacing between the high-voltage electrode and the at least one
(Continued)

Figure 1:
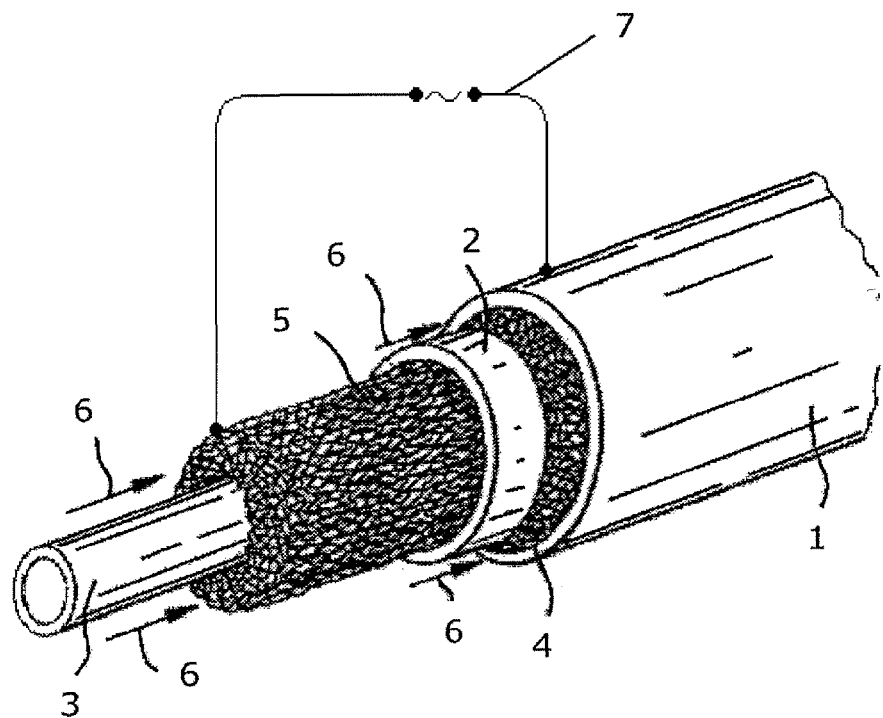

counter-electrode are constant. The number of surface discharge locations decreases in the flow direction.

19 Claims, 2 Drawing Sheets

(51) Int. Cl.
 *C02F 1/78* (2006.01)
 *H01T 19/00* (2006.01)
 *H01T 23/00* (2006.01)

(52) U.S. Cl.
 CPC .......... *H01T 23/00* (2013.01); *C01B 2201/12* (2013.01); *C01B 2201/14* (2013.01); *C01B 2201/22* (2013.01); *C01B 2201/64* (2013.01); *C02F 2201/002* (2013.01); *C02F 2201/782* (2013.01); *C02F 2303/04* (2013.01)

(56) References Cited

U.S. PATENT DOCUMENTS

| | | | |
|---|---|---|---|
| 8,728,402 B2 | 5/2014 | Vezzu | |
| 8,808,634 B2* | 8/2014 | Fietzek | C01B 13/11 422/186.18 |
| 9,174,188 B2 | 11/2015 | Fietzek et al. | |
| 10,647,575 B2* | 5/2020 | Fiekens | H01T 19/00 |
| 2013/0330243 A1 | 12/2013 | Fietzek et al. | |

FOREIGN PATENT DOCUMENTS

| | | | |
|---|---|---|---|
| KR | 101164290 B1 | 7/2012 | |
| KR | 20140010032 A | 1/2014 | |
| WO | 9214677 A1 | 9/1992 | |
| WO | 9709268 A1 | 3/1997 | |

OTHER PUBLICATIONS

International Search report and Written Opinion for International Application No. PCT/EP2016/050790, dated Apr. 4, 2016—8 Pages.
International Preliminary Report on Patentability for International Application No. PCT/EP2016/050790, 7 pages.
International Preliminary Report on Patentability for International Application No. PCT/EP2016/050761, dated Aug. 29, 2017, 6 pages.
Notice of Allowance for U.S. Appl. No. 15/552,678, dated Jan. 15, 2020, 11 pages.
International Search Report and Written Opinion for International Application No. PCT/EP2016/050761, dated Apr. 11, 2016—14 Pages.

* cited by examiner

State of the Art

OZONE GENERATOR WITH POSITION-DEPENDENT DISCHARGE DISTRIBUTION

CROSS-REFERENCE TO RELATED APPLICATIONS

This patent application is a U.S. National Phase Patent Application of PCT Application No. PCT/EP2016/050761, filed Jan. 15, 2016, which claims priority to German Patent Application No. 102015002102.8, filed Feb. 23, 2015, each of which is incorporated by reference herein in its entirety.

FIELD OF THE INVENTION

The present invention relates to an ozone generator and an ozone producer which is provided therewith.

BACKGROUND OF THE INVENTION

Generic ozonisers comprise a plurality of ozone generators, arranged in parallel to one another between two tube sheets in the manner of a tube-bundle heat exchanger. Internally, the tubes create discharge chambers in the form of hollow cathodes. Anode rods with dielectric are arranged in these discharge chambers, which during operation are impinged upon by a high voltage and which cause a silent discharge between the anode rod and the tube. An oxygenated gas or pure oxygen is passed through this interstice. The silent discharge generates ozone molecules in the oxygenated gas from oxygen molecules. The gas flow enriched with ozone in this way can, by way of example, be used for disinfection purposes.

Most of the electrical power that has to be supplied to an ozone generator results in waste heat. This waste heat is dissipated by cooling measures, such as for example liquid cooling of the outer electrode. Here, the cooling water heats up as it passes through the tube bundle and is cooled to a temperature of a few degrees Celsius in a circuit by a heat exchanger in a cooling unit.

A mechanism that impairs the efficiency of an ozoniser is the unavoidable temperature gradient that arises along the tubes between the cooling water entry and the cooling water exit.

The efficiency of ozonisers is highly dependent on the temperature in the discharge gap. The formation of ozone preferably takes place at low temperature. In addition, the ozone increasingly disintegrates as the temperature rises. This temperature-induced ozone depletion reduces the overall efficiency of the ozoniser. To raise the ozone yield, therefore, a targeted manipulation of the effective reaction temperature along the ozone generator is desired.

An ozone generator is known from JP-H-0881205 having a conical outer electrode, in contact with a dielectric, which in a first embodiment has a thickness that increases along the length of the ozone generator and in a second exemplary embodiment has a constant thickness. What these arrangements have in common is that the power recorded in the gas gap decreases continuously over the length of the ozone generator. In this way, the increase in temperature over the length of the ozone generator is reduced, as a result of which the effective reaction temperature can be kept almost constant. The disadvantage here is that the manufacture of the outer electrode and of the dielectric is relatively complicated and cost-intensive.

SUMMARY OF THE INVENTION

The object of the present invention is to provide an ozone generator in which the degree of efficiency is increased by reducing the electrical power supplied to the electrode surface unit in the flow direction of the gas, wherein the ozone generator is constructed in the most simple and cost-effective manner possible.

This object is achieved by an ozone generator with a high-voltage electrode (5) and at least one counter electrode (1), which define an interstice, in which at least one dielectric (2) is arranged and though which a gas flows in the flow direction, wherein the high-voltage electrode (5) and the at least one counter electrode (1) are provided with a connection for an electrical voltage supply (7) in order to produce silent discharges which are discharged from surface locations, and wherein the mean spacing between the high-voltage electrode (5) and the at least one counter-electrode (1) and the mean sparking distance are constant, characterised in that the number of surface locations from which the silent discharges are discharged decreases in the flow direction.

Accordingly, there is provided an ozone generator having a high-voltage electrode and at least one counter-electrode which delimit an intermediate space in which at least one dielectric is arranged and through which a gas flows in a flow direction, wherein the high-voltage electrode and the at least one counter-electrode are provided with a connection for an electrical power supply in order to produce silent discharges which are discharged from surface locations, and wherein the mean spacing between the high-voltage electrode and the at least one counter-electrode and the mean sparking distance are constant, wherein the number of surface locations from which the silent discharges are discharged decreases in the flow direction. As a result of this variation of the surface locations, the electrical power which is introduced and consequently the effective reaction temperature can be influenced. The number of surface locations decreases per unit of length. Since the mean spacing between the high-voltage electrode and the at least one counter-electrode and the mean sparking distance are constant, this ozone generator is simple and cost-effective to produce.

Preferably, the number of surface locations available for the electrical discharges continuously decreases.

In an embodiment, there is provision for the surface locations to be formed by means of a profiling of the high-voltage electrode. However, there may also be provision for the dielectric and/or the high-voltage electrode to be profiled. Furthermore, the same effect can be achieved if the counter-electrode is profiled at the inner side.

Preferably, the surface locations are formed by means of a wire braiding. In this instance, the wire braiding may inter alia form the high-voltage electrode itself or be part of the high-voltage electrode.

Preferably, the ozone generator has a single counter-electrode and the dielectric is arranged in abutment with the counter-electrode. The ozone generator is consequently constructed as a single column system. The sparking distance is in this instance defined as the spacing between the dielectric and the high-voltage electrode.

The ozone generator may be constructed as a tubular or plate-like ozone producer. In a plate-like ozone producer, the high-voltage electrode and the at least one counter-electrode are plates.

Furthermore, as a result of the described technical advantages, it is advantageous to use and produce for the disinfection of water or for the bleach of wood pulp, chemical pulp or pulp in paper production an ozone producer which has at least one ozone generator having one of the above features.

BRIEF DESCRIPTION OF THE DRAWING FIGURES

Figure 2:
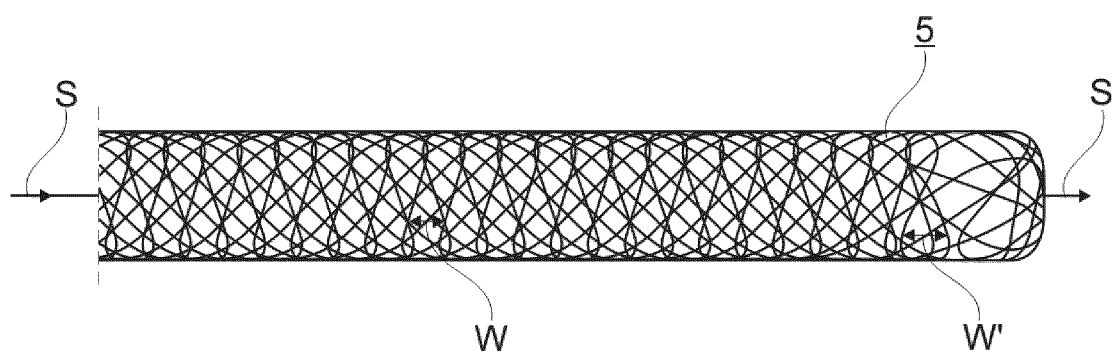

A preferred embodiment of the invention is explained in more detail below using the drawings, wherein:

FIG. 1: shows a perspective view of an electrode arrangement of the prior art, and FIG. 2: shows a schematic representation of a wire braiding according to the invention.

DETAILED DESCRIPTION OF THE INVENTION

FIG. 1 shows an electrode arrangement of an ozone generator, as is known from DE 10 2011 008 947 A1. Such ozone generators are used grouped together in a single ozoniser. Here the ozone generators are arranged in parallel to one another between two tube sheets in the manner of a tube-bundle heat exchanger and electrically connected in parallel. The ozone generator shown has a tubular outer electrode 1, a similarly tubular dielectric 2 and an internal rod 3, wherein the individual components are shown truncated and pulled apart in the axial direction. The arrangement is rotationally symmetric. The outer electrode 1, the dielectric 2 and the rod 3 are aligned concentrically to one another. Between the outer electrode 1 and the dielectric 2 is a wire mesh 4, which fills the interstice. Between the dielectric 2 and the rod 3 a knitted wire fabric 5 which also fills the interstice located there. The outer electrode 1 is formed as a stainless-steel tube. The waste heat resulting from the ozone production is cooled by cooling water, which is passed over the outside of the outer electrode between the tube sheets. The dielectric 2 is a glass tube. The wire meshes 4 and 5 are preferably what are known as round hollow lines similarly made from a stainless-steel wire mesh. The rod 3 arranged in the centre of the electrode arrangement is an insulator, by way of example made from glass or another oxygen- and ozone-compatible material. The rod 3 can have a solid design. During operation, the electrode arrangement is impinged upon by an oxygenated feed gas, flowing through the wire meshes 4 and 5 in the direction of the arrow 6. An electrical voltage supply 7 is shown schematically in contact on one side with the outer electrode 1 and on the other with the mesh 5. The operating voltage provided by the voltage supply 7 brings about in the space between the electrodes 1, 5 and the dielectric 2 a silent electrical discharge, which generates ozone from the oxygen flowing in the direction of arrow 6 through the meshes 4 and 5.

In the structure shown, the inner electrode is formed solely by the mesh 5, while the rod 3 as the insulator performs a support function, ensuring at the same time the filling of the interior of the dielectric 2 with the wire mesh 5. The gap width or striking distance d is the distance between an electrode and the dielectric. The electrical voltage supply 7 supplies the ozone generator with a sinusoidal voltage. The shape of the electrode results in a superimposition of volume and surface charge.

In contrast to ozone generators which have a defined gap width, as a result of the profiling of the high-voltage electrode 5, there are produced specific surface locations from which the silent discharges are discharged.

The temperature in the gas gap is dependent inter alia on the wall temperature (coolant temperature) but also on the electrical power introduced. The electrical power introduced is in turn dependent on the ignited gap width and the number of discharges.

According to the invention, the surface locations available for discharging along the ozone generator varies so that the electrical power introduced decreases in the flow direction of the gas. In this case, the mean gap width remains substantially constant and the number of discharges per length unit decreases.

The variation of the surface locations may in this instance be carried out both continuously and discontinuously.

The number of discharges per unit of length is influenced along the ozone producer by a change of the distribution of the surface locations from which discharges are discharged. The spacing between the outer and the inner electrode and the sparking distance remains on average constant.

In a first embodiment, there is provision for the distribution of the surface locations to be produced by means of a change of the profiling of one of the electrodes. The profiling of the electrode produces a distribution of specific surface locations, from which discharges are discharged. The remaining surface of the electrode is not available for the production of discharges. As a result of variation of profiling or surface locations in the flow direction of the gas, the number of discharges per unit of length can be reduced. A variation possibility is, with an electrode 5 of wire braiding, to adapt the mesh width W, W', see FIG. 2. Here the mesh width W, W' increases in the flow direction S, so that the number of discharges per unit of length in the flow direction S decreases.

The high-voltage electrode is an electrically conducting material, preferably stainless steel with a profiled surface. The high-voltage electrode may be a wire braiding or a knitted fabric, a woven fabric or also a wire winding or a granulate applied to a surface. Fibrous structures such as fleeces or felts are equally suitable as structures which are applied to the electrode by means of mechanical processing or coating. In this instance, the profiling is preferably distributed in a stochastic or periodic manner both in the longitudinal and in the peripheral direction of the electrode. In one embodiment, this high-voltage electrode extends as far as the dielectric, that is to say, there are locations at which the braiding, woven fabric or the like is in abutment with the dielectric.

However, it is also conceivable in place of the electrode to profile the dielectric, whereby the same effect can be achieved.

The ozone generator according to the invention is not limited to a tubular electrode arrangement. It can be used for both tubular and plate-like generic ozonisers. In this instance, provision is made for application in single-column and multi-column systems. The electrically conductive material of the electrode can be introduced into the discharge space with or without carrier material.

Due to the variation according to the invention of the surface locations from which discharges are discharged, it is possible to reduce the electrical power supplied to the electrode surface unit in the flow direction of the gas and thus influence the gas temperature in the discharge gap and increase the efficiency of the ozone generator. Due to the particularly simple geometry of the electrode arrangement the ozone generator can be manufactured simply and inexpensively.

The invention claimed is:

1. An ozone generator comprising:
a high-voltage electrode having a surface and a length;
at least one counter electrode;
an interstice configured to support a flow of gas in a flow direction between the high-voltage electrode and the at least one counter electrode, the interstice having at least one dielectric therein, the interstice defining a constant mean sparking distance and a constant mean spacing between the high-voltage electrode and the at least one counter-electrode;

an electrical voltage supply connected to the high-voltage electrode and the at least one counter electrode; and a plurality of surface discharge locations on the surface of the high-voltage electrode, each configured to produce silent discharges, the number of surface discharge locations per unit length decreasing in the flow direction from a first non-zero number per unit length to a second non-zero number per unit length.

2. The ozone generator according to claim 1, wherein the number of surface discharge locations continuously decreases in the flow direction.

3. The ozone generator according to claim 1, wherein the high-voltage electrode comprise a mesh, braid, knit, weave, or winding of wire that defines said surface discharge locations.

4. The ozone generator according to claim 3, wherein the wire defines a mesh having a mesh width, wherein the mesh width increases in the flow direction causing the decreasing number of surface discharge locations in the flow direction.

5. The ozone generator according to claim 1, wherein the ozone generator has a single counter-electrode and the at least one dielectric abuts the counter-electrode.

6. The ozone generator according to claim 1, wherein the ozone generator is a plate-type ozone producer and the high-voltage electrode and the at least one counter-electrode form plates.

7. The ozone generator according to claim 1, wherein the high-voltage electrode, the at least one dielectric and the counter-electrode are aligned concentrically with one another.

8. The ozone generator according to claim 7, wherein the high-voltage electrode comprises a conductive outer tube surrounding a first conductive annular structure, the at least one dielectric comprises an inner dielectric tube concentrically surrounded by the first conductive annular structure, and the counter electrode comprises a second conductive annular structure concentrically disposed between the inner dielectric tube and an insulator rod.

9. The ozone generator according to claim 8, wherein the first conductive annular structure and the second conductive annular structure comprise a structure selected from the group consisting of: wire braiding, a knitted fabric, a woven fabric, a wire winding, a granulate applied to a surface, a fibrous structure, a fleece, a felt, and a coating.

10. An ozoniser for disinfection of water, the ozoniser having at least one ozone generator according to claim 1.

11. An ozone producer for bleaching pulp, the ozone producer having at least one ozone generator according to claim 1.

12. The ozone producer of claim 11, wherein the pulp comprises wood or chemical pulp.

13. The ozone generator of claim 1, wherein the plurality of surface discharge locations on the high-voltage electrode correspond to a profiled surface of the high-voltage electrode.

14. The ozone generator of claim 1, wherein the plurality of surface discharge locations on the high-voltage electrode correspond to a profiled surface of the at least one dielectric.

15. The ozone generator of claim 1, wherein the plurality of surface discharge locations on the high-voltage electrode correspond to a profiled surface of the at least one counter electrode.

16. A method for generating ozone using the ozone generator of claim 1, the method comprising:

providing a gas containing oxygen to the interstice in the flow direction, energizing the ozone generator with an electrical voltage from the electrical voltage supply; and causing silent discharges to discharge from the surface discharge locations, causing at least some of the oxygen in the gas to convert into ozone.

17. The method of claim 16, further comprising using the ozone produced by the ozone generator for disinfection of water.

18. The method of claim 16, further comprising using the ozone produced by the ozone generator for bleaching pulp.

19. The method of claim 18, wherein the pulp comprises wood pulp, chemical pulp, or a pulp in paper production.

* * * * *